Sept. 7, 1965  G. E. DUNN  3,204,427
UNIVERSAL JOINT
Filed May 27, 1963  4 Sheets-Sheet 1

INVENTOR.
George E. Dunn
BY
Harness and Harris
ATTORNEYS.

Sept. 7, 1965  G. E. DUNN  3,204,427
UNIVERSAL JOINT

Filed May 27, 1963  4 Sheets-Sheet 4

INVENTOR.
George E. Dunn
BY
Harness and Harris
ATTORNEYS

United States Patent Office 3,204,427
Patented Sept. 7, 1965

3,204,427
UNIVERSAL JOINT
George E. Dunn, Orchard Lake, Mich., assignor to Chrysler Corporation, Highland Park, Mich., a corporation of Delaware
Filed May 27, 1963, Ser. No. 283,156
16 Claims. (Cl. 64—8)

This invention relates generally to universal joints and more particularly to such types of universal joints wherein the input and output shafts experience both relative angular and axial movement.

Axially slidable universal joints, generally well known in the art, are comprised of a housing having axially directed openings therein and a shaft, trunnion and bearing assembly receivable in the housing. In the usual arrangement, a housing is provided with an axially extending central shaft receiving opening and a pair of spaced axially directed bearing receiving guideways formed on opposite sides of the central opening. A shaft received within the central opening carries a transversely positioned trunnion member provided with a bearing assembly at each end thereof which are received within the guideways. When relative movement occurs between the housing and shaft, the bearing assemblies slide against the wall surfaces generally defining the guideways formed in the housing.

Such sliding contact as occasioned during normal operation, has in the past, caused the guideway wall surfaces to wear rapidly so as to necessitate the disassembly and replacement of parts or even the replacement of the entire universal joint.

Attempts have heretofore been made to alleviate this problem of excessive wear. However, such attempts have not proven to be entirely successful. For example, it has been suggested that bearing guideways be hardened. Such hardening required the subsequent grinding of the guideway surfaces which has proven to be a difficult problem. That is, because of the location of the guideways and the generally elongated configuration thereof, it is extremely difficult to grind the guideway surfaces to be dimensionally correct especially with regard to surface spacing and parallelism.

Still others have proposed the provision of a channel-like unitary insert, which in cross-section closely follow the outer configuration of the trunnion bearing assemblies, within what might generally be referred to as an oversized guideway. Such formed channel-like unitary inserts have not been entirely acceptable because of the critical nature of the dimensions required in producing a unitary insert which at its outer surface is closely received by the oversized guideway and which, in turn, closely receives within its inner surface the trunnion bearing surfaces.

Accordingly, an object of this invention is to provide a new and improved universal joint having means provided therein for effectively reducing the wear between the trunnion bearings and cooperating guideways which would otherwise occur in universal joints heretofore known in the art.

Another object of this invention is to provide, in a universal joint, means for reducing the thrust forces normally encountered by the bearings and guideways constructed in accordance with the prior art.

Other objects and advantages of the invention will become apparent when reference is made to the following description and drawings wherein:

FIGURE 2 is a cross-sectional view taken generally on the plane of line 2—2 of FIGURE 1 and looking in the direction of the arrows;

Figure 1:
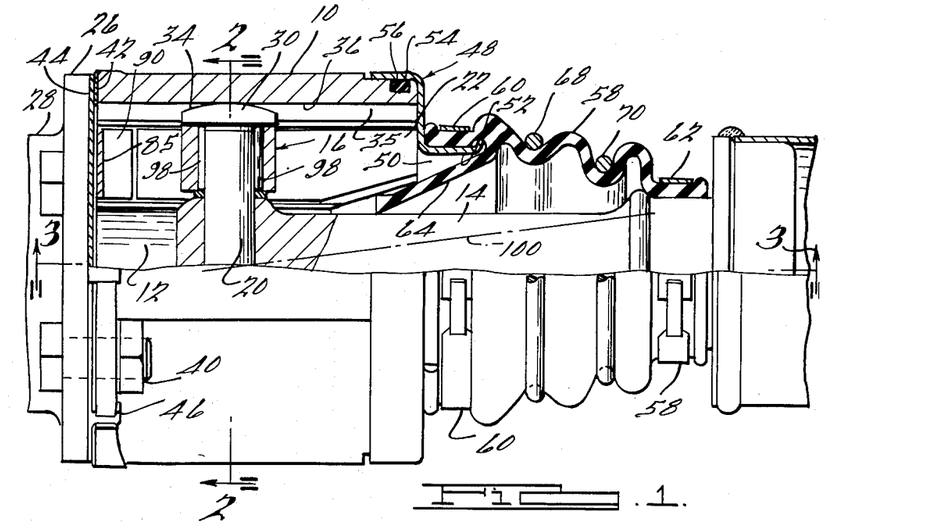
FIGURE 1 is a side elevational view, with portions thereof broken away and in cross-section, illustrating a universal joint constructed in accordance with the teachings of this invention.

Referring now in greater detail to the drawings, FIGURES 1 and 2 illustrate one form of a universal joint constructed in accordance with the invention as being comprised of an outer housing or body 10 provided with a centrally located bore 12 for the reception therein of one end of a shaft 14. Bearing assemblies 16 and 18 located about the ends of a trunnion 20, secured to and extending transversely through shaft 14, are closely confined between individual inserts 22 which are received within an axially extending slot 24 formed generally transversely of body 10.

Centering buttons 30 and 32, loosely received within the ends of trunnion 20 have their outer surfaces 34 in abutting engagement with the outermost surfaces 36 and 38, respectively, of slot 24. Surfaces 34 are of arcuate cross-section so as to form segments of a cylinder having its axis of revolution passing transversely of the trunnion 20.

One end of body 10 may be secured to a flange portion 26 of a suitable torque transmitting shaft 28 as by means of a plurality of cooperating bolts and nuts 40. A gasket 42 and grease cover 44, located generally between flange 26 and body 10, are secured to the body as by means of integral tabs 46 formed on the grease cover 44. The other end of body 10 has secured thereto, as by staking, an end cover 48 provided with a centrally located opening 50, defined by a flange portion 52 extending axially of body 10, for the reception therethrough of shaft 14. An O-ring 54, located within an annular groove 56, may be provided in order to prevent the passage of foreign particles between body 10 and cover 48 and into the joint assembly.

Figure 3:
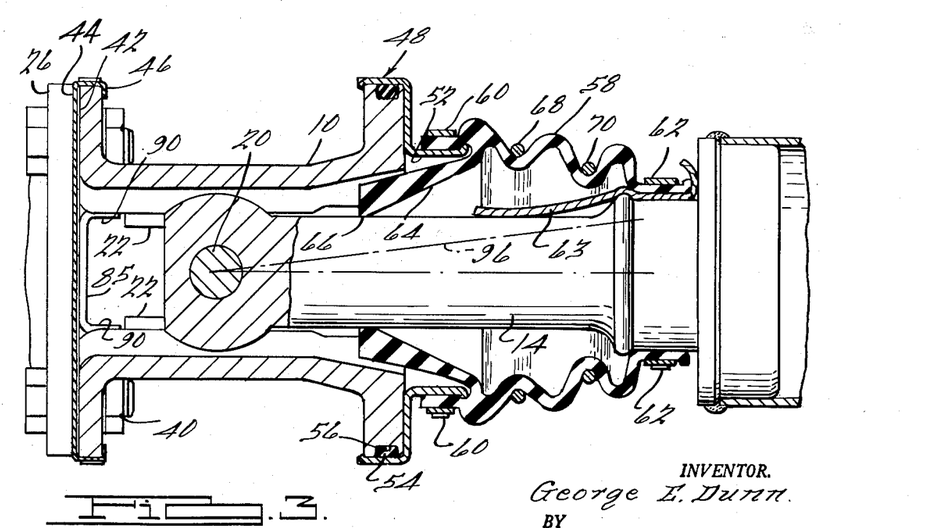
FIGURE 3 is a cross-sectional view taken generally on the plane of line 3—3 of FIGURE 1 and looking in the direction of the arrows.

A flexible tubular seal 58 has one end constrained about the cover flange 52 as by means of an outer metal strap 60. Similarly, the other end of seal 58 is held in sealing engagement with shaft 14 by a strap 62. Seal 58 is preferably convoluted so as to enable axial elongation and contraction thereof during relative movement between shaft 14 and housing 10. A fibrous or other air permeable member 63 may be provided between seal 58 and shaft 14 in order to allow the passage of air therethrough so as to equalize the pressures internally and externally of the seal 58 during such periods as when said seal is undergoing elongation or contraction. A generally conical portion 64 of seal 58 tapers inwardly toward the center of seal 58 and terminates in an opening 66 for closely receiving shaft 14 and preventing the flow of lubricants from housing 10 into the convoluted portion of seal 58. Conical portion 64 may have certain sections thereof provided with increased cross-sectional thickness, as illustrated in FIGURE 3, for increasing axial rigidity thereof. Although not entirely necessary, reinforcing rings 68 and 70 may be provided about seal 58 in order to prevent undue radial distortion of the seal during severe operating conditions.

The universal joint of FIGURES 1, 2 and 3 embodies unique features and improvements over the prior art which will be described in greater detail in conjunction with the following description of the method employed in manufacturing the universal joint.

Body 10 is preferably cast from a material such as malleable iron to a configuration as illustrated except that the internal cross-sectional shape thereof, as determined generally by the central opening 12 and slot 24, is provided with additional material to be removed by subsequent machining operations.

The cast housing 10 is then secured in a suitable machining fixture and all internal surfaces, including end surfaces 36 and 38, side surfaces 72, 74, 76 and 78 and central opening 12, are broached to finished dimensions. Depending upon the amount of metal to be removed, the finished internal dimensions may be achieved by a plurality of broaching operations. That is, a first broaching operation could remove enough metal so as to closely approach the finished dimensions and a second broaching operation would remove a sufficient amount of the remaining metal so as to obtain the desired final dimensions.

Even though the broaching can be accomplished in several operations, it is important that not only parallelism be achieved between finished surfaces 72, 74 and 76, 78 but that surfaces 72 and 74 be as nearly coplanar as practically possible with surfaces 76 and 78, respectively. Accordingly, it has been discovered that a single finishing broach having a cross-sectional machining surface capable of producing the entire slot 24, with all of its defining surfaces, produces the desired dimensional relationships. In addition to defining slot 24, the finished broaching operation also produces a plurality of longitudinal axially directed lubricating grooves 80 in the wall surfaces 72, 74, 76 and 78.

Inserts 22, received within the slot 24 against the respective wall surfaces, thereof, are first hardened and ground to a prescribed thickness, the dimension of which may be maintained to a total tolerance in the order of 0.0005 inch. The achievement of such tolerances is, of course, a simple matter in the grinding of flat metal stock.

Assembly of the universal joint is accomplished in the following manner. Trunnion 20 is inserted through shaft 14 and bearing assemblies 16 and 18 and thrust washers 82 secured about the ends thereof. Centering buttons 30, 32 and spacers 84 are then secured to the end trunnion 20. Two generally U-shaped spacers or abutments 85 may be provided within one end of slot 24 for use in conjunction with inserts 22 as will be described; one of the abutments is retained between walls 72 and 74 while the other abutment is similarly retained between walls 76 and 78.

Inserts 22 are then placed against wall surfaces 72 and 76, or against surfaces 74 and 78, and the subassembly comprised of trunnion 20, shaft 14, bearing assemblies 16 and 18 and centering buttons 30, 32 is inserted into the slot 24 and central opening 12. Bearing rollers 86 and 88 of bearing assemblies 16 and 18, respectively, are then brought into abutting engagement with the inserts 22 which have been placed within the slot 24. With the bearing rollers 86 and 88 being maintained in such abutting contact, the remaining two inserts 22 are selected and placed within slot 24 on the opposite sides of the bearing rollers. Since a dimensional tolerance exists on the thickness of inserts 22, the remaining two inserts can be selected for the best possible fit by trying various inserts until two are found which give the closest sliding fit without causing any interferences between the various cooperating surfaces.

When the interior of the universal joint is filled with a lubricant, grooves 80 provide passage means for the flow of lubricant behind the races 22. The flow of such lubricant is further enhanced by the general internal pumping action of the joint during actual use thereof. That is, the gradient of centrifugal forces plus the continual relative movement between the bearing assemblies 16, 18, shaft 14 and centering buttons 30, 32 and the housing 10 cause the lubricant contained within the housing to be in constant motion.

In this manner the abutting surfaces of the races or inserts 22 and respective wall surfaces become lubricated thereby permitting each of the races to experience relative movement with respect to the slot 24 and housing 10. Displacement of races 22 axially of housing 10 is limited at one end by the legs 90 of U-shaped abutment members 85 and limited at the other end by the cover member 48. Also, abutments in the form of shoulders 92 and 94 are provided in order to limit the movement of inserts 22 in a direction generally axially of trunnion 20.

Relative angular movement of shaft 14 to a position indicated generally by centerline 96 of FIGURE 3 is accomplished in an unrestricted manner by virtue of trunnion 20 freely rotating within the needle bearings 98 contained within each of the bearing rollers 86 and 88 of bearing assemblies 16 and 18, respectively. However, relative angular movement of shaft 14 to a position indicated generally by centerline 100 of FIGURE 1 is accompanied by some sliding friction between the respective bearing rollers 16, 18 and cooperating races or inserts 22 because of the generally counter-clockwise rotation, as viewed in FIGURE 1, of bearing assemblies 16 and 18 about the center of rotation determined by the arcuate surfaces 34 of centering buttons 30 and 32.

The sliding action of the bearing rollers against the raceways constructed in accordance with the prior art resulted in excessive wear of the contacting surfaces. However, the invention as disclosed greatly minimizes, if not substantially eliminates, such wear. That is, assuming shaft 14 to be undergoing angular motion with respect to housing 10, it can be seen that because of the lubricating grooves 80, not only can relative motion be experienced as between bearing rollers 16 and 18 and cooperating races or inserts 22 but further relative motion can simultaneously occur as between the respective inserts 22 and wall surfaces 72, 74, 76 and 78 of slot 24. Accordingly, relative angular motion, as depicted in FIGURE 1, between the trunnion 20 and housing is divided generally into two other relative motions one of which occurs between the bearing rollers and the inserts 22 and the other of which occurs as between the insert and cooperating wall surface of slot 24. Consequently if wear should occur, such wear is not concentrated between the bearing roller and insert. Further any possible wear as between the insert 22 and wall surface is also minimized because of the relatively large and lubricated sliding surface of the insert which serves to dissipate any loading forces over a large area.

The provision of outer cylindrical surfaces 34 of single radial dimension on the centering buttons 30 and 32 as contrasted to the prior art which employed compound, spherical or conical outer surfaces formed on the centering buttons results in a further improvement. That is regardless of the angle which shaft 14 assumes, as viewed in FIGURE 1, the forces or loads carried by the centering buttons are transmitted through a substantially constant width of the centering button to the cooperating end surface such as 36. This is of significance especially as compared to the prior art wherein, because of the various compound curvatures of the centering buttons, forces had to be transmitted through centering surfaces which became progressively smaller as the angle between the shaft 14 and housing became greater. Consequently, in prior art arrangements the force transmitted per unit of area became progressively higher at greater shaft deflections resulting in rapid localized wear of the centering buttons and end surfaces such as 36. Centering buttons 30 and 32 are also closely confined within the longitudinally extending spaced parallel side surfaces 33, 35 and 37, 39 which, respectively, intersect end surfaces 36 and 38. By creating such confinement, the axis of curvature of cylindrical surfaces 30 and 34 is maintained perpendicular with respect to the axis of bore 12 and housing 10 throughout the entire range of operation.

Figure 4:
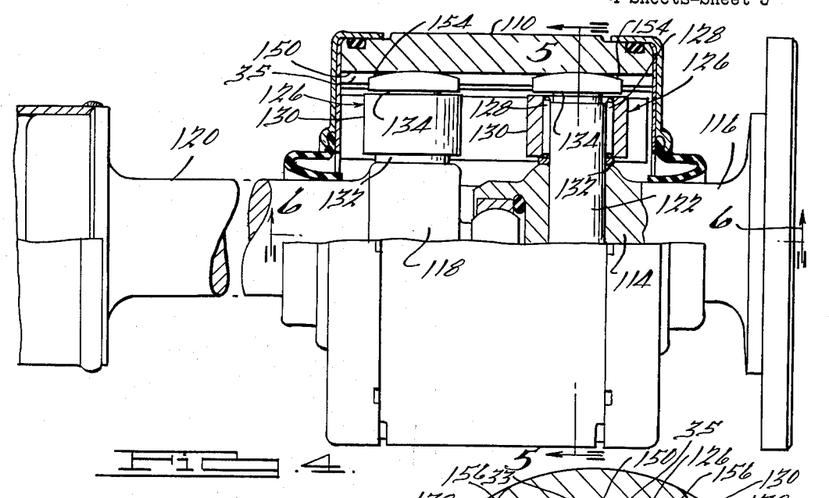
FIGURE 4, a view similar to that of FIGURE 1, illustrates a double type constant velocity universal joint constructed in accordance with the invention.
Figures 5, 6:
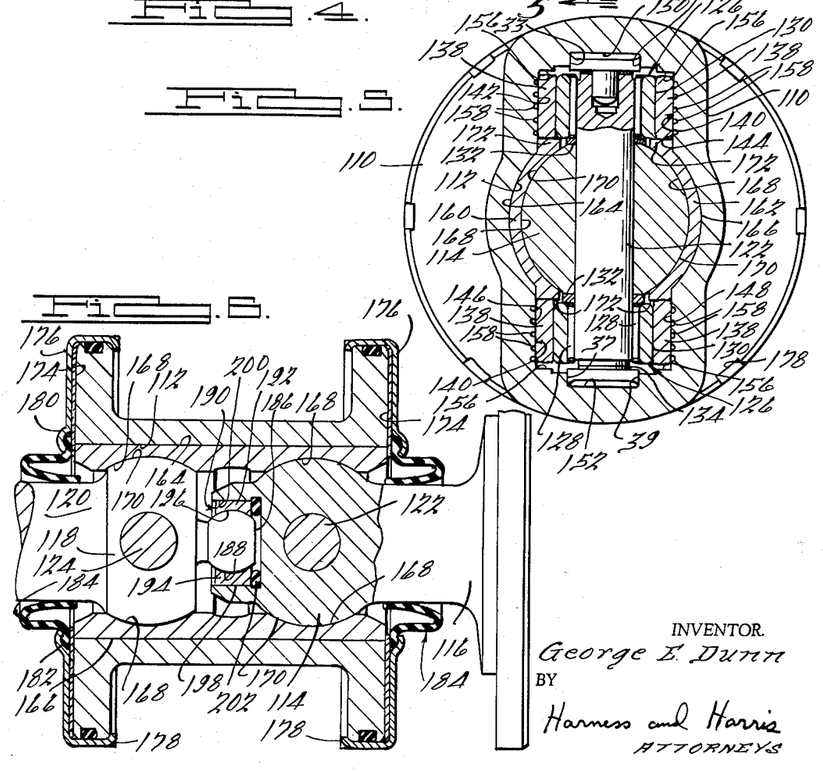
FIGURE 5 is a cross-sectional view taken generally on the plane of line 5—5 of FIGURE 4 and looking in the direction of the arrows.
FIGURE 6 is a longitudinal cross-sectional view taken generally on the plane of line 6—6 of FIGURE 4.
Figure 6:
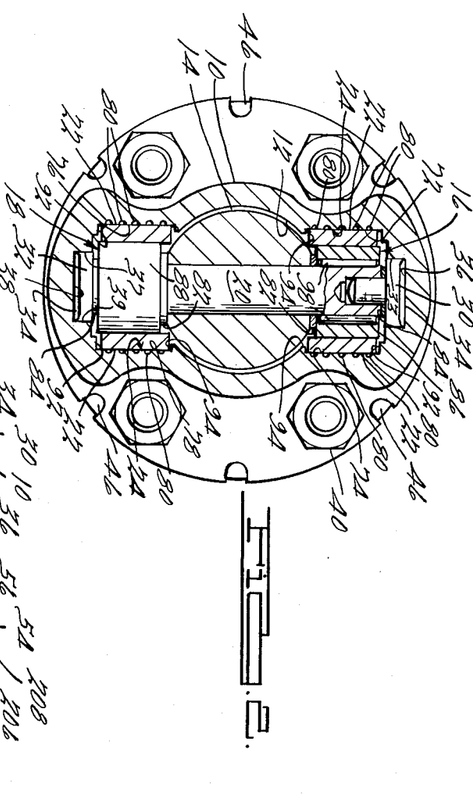

Another form of the invention is disclosed as being embodied in a double-type universal joint of FIGURES 4, 5 and 6 which is comprised of an outer housing or body 110 provided with a centrally located bore 112 for the reception therein of one end 114 of an input shaft 116 and one end 118 of an output shaft 120. Trunnions 122 and 124, transversely received through shaft ends 114 and 118, respectively, each carry about the respective projecting ends thereof bearing assemblies 126 each of which is comprised of a plurality of needle bearings 128 contained within a bearing roller 130. Thrust washers 132 may also be provided about the respective trunnions between the bearing assemblies 126 and ends 114 and 118 of shafts 116 and 120. Likewise, spacers 134 may be provided between the ends of the trunnions 122, 124 and the centering buttons 136 received therein.

Bearing assemblies 126 of both trunnions 122 and 124 are closely confined between individual hardened and ground inserts or bearing raceways 138 which are received within an axially extending slot 140 formed generally transversely of body 10 and having wall surfaces 142, 144, 146 and 148. Centering buttons 136, also carried by the trunnions 122 and 124, are confined generally within end surfaces 150 and 152 of slot 140. The outer most surfaces 154 of the centering buttons are arcuate so as to form segments of a cylinder having its axis of revolution passing transversely through the trunnion carrying the buttons.

Slot 140, including abutments or shoulders 156, bore 112 and the plurality of axially extending lubrication grooves 158 may be formed by broaching as previously described with reference to FIGURES 1, 2 and 3.

Thrust plates 160 and 162, closely received within bore 112 and having outer cylindrical surfaces 164 and 166, respectively, are positioned in opposed relationship to each other about ends 114 and 118 of shafts 116 and 120. Each of the thrust plates has two internally formed spherical surfaces 168 which are adapted to receive and generally contain cooperating spherical surfaces 170 formed on an enlarged portion of shaft ends 114 and 118.

Inserts 138, as inserts 22 of FIGURE 1, are capable of experiencing motion relative to slot 140. Movement generally axially of trunnions 122 and 124, is, however, limited by abutments or shoulders 156 and laterally extending portions 172 formed on the thrust plates 160 and 162, while movement of the inserts generally axially of the housing 110 is limited by retainers 174 contained between the ends of the housing 110 and end covers 176 secured thereto as by deformed tabs or ears 178.

Clearance apertures, formed generally centrally of the end covers 176 for the reception therethrough of shafts 116 and 120, are shaped as at 180 in order to retain a beaded peripheral edge 182 of an annular flexible and resilient dust cover 184 which is formed over so as to engage the outer diameter of the respective shafts 116 and 120.

The general mode of operation and method of construction as described with reference to the invention disclosed in FIGURES 1, 2 and 3 and the advantages attendant thereto, apply equally well to the embodiment of FIGURES 4, 5 and 6.

Further advantages and features are, however, embodied within the structure of FIGURES 4–5 which is commonly referred to as a constant velocity universal joint. That is, end 118 of shaft 120 has formed thereon an axially extending projection 186 having a spherical surface 188 adapted to be pivotally received within a centering ring 190. The centering ring is comprised of at least two arcuate segments 192 and 194 each having an internally formed spherical surface 196 and an external cylindrical surface 198 by which the centering ring is slidably received within a counterbore or recess 200 of shaft 116. The counterbore 200 is provided with a resilient member such as an O-ring 202 for urging the centering ring against the spherical surface 188 of projection 190.

As shaft 120 is pivoted within spherical surface 168, projection 186 is correspondingly rotated causing complementary rotative movement to be imparted to shaft 116 by means of the centering ring 190. Since the distance between the centers of spherical surfaces 168 and 188 is fixed, the centering ring 190, which is formed of a sintered metal impregnated with a suitable lubricant, experiences a slight amount of axial movement with respect to bore 200 whenever shafts 116 and 120 are moved angularly with respect to housing 110.

It should be noted that the projection 186 and the centering ring 190 do not carry any of the axial forces which might be directed against shafts 116 and 120. As can be seen in FIGURE 6, axial forces tending to pull shafts 116 and 120 away from each other are totally transmitted to the spherical surfaces 168 or thrust plates 160 and 162. Likewise, all of the axial forces, with the exception of the comparatively insignificant amount transferred through the resilient O-ring 202, tending to push the shafts 116 and 120 closer to each other are also dissipated through spherical surfaces 168 of the thrust plates. Consequently, the total wear incurred by the coacting projection 186 and centering ring 190 is minimized by the elimination of a substantial amount of the forces working thereagainst and transferring such forces to other areas of the universal joint.

Figure 7:
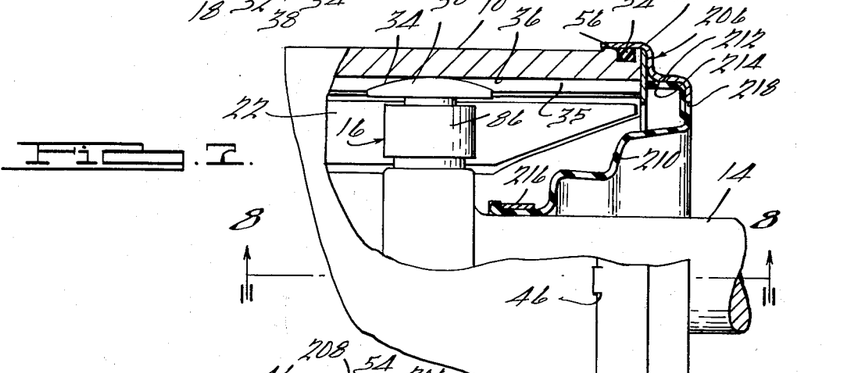
FIGURE 7, a fragmentary view similar to FIGURE 1 and partially in cross-section illustrates another embodiment of the invention.
Figure 8:
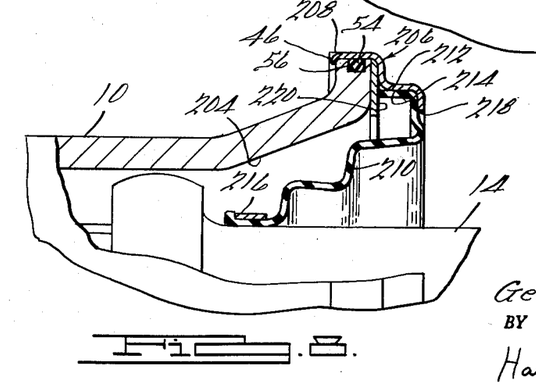
FIGURE 8 is a fragmentary cross-sectional view taken generally on the plane of line 8—8 of FIGURE 7 and looking in the direction of the arrows.

FIGURES 7 and 8, illustrate another embodiment of the invention as disclosed by FIGURES 1, 2 and 3. All elements which are like or similar to those of FIGURES 1, 2 and 3 are identified with like reference numbers. In order to provide for greater relative angularity between housing 10 and shaft 14, portion 204 is flared outwardly to a greater extent and a fabricated seal assembly 206 is contained partly within the space between portion 204 and shaft 14.

Seal assembly 206 is comprised of a cup-like metallic end cover 208, secured to housing 10 as by a plurality of tabs or ears 46, and an annular resilient seal member 210 which is cemented near its outer peripheral edge, as at 212, to the inner surface 214 of the cover 208. Seal 210, having a plurality of annularly formed and axially spaced convolutions, is secured to shaft 14 by means of a metal strap 216 placed about the seal near the inner periphery thereof. An aperture 218 formed within cover 208 permits axial movement of seal 210 as occasioned during axial movement of shaft 14 relative to housing 10. A retainer 220, similar to retainer 174 of FIGURE 6, is held in proper position against the housing 10 by the confining effect of end cover 208.

Figures 9, 10, 12, 14:
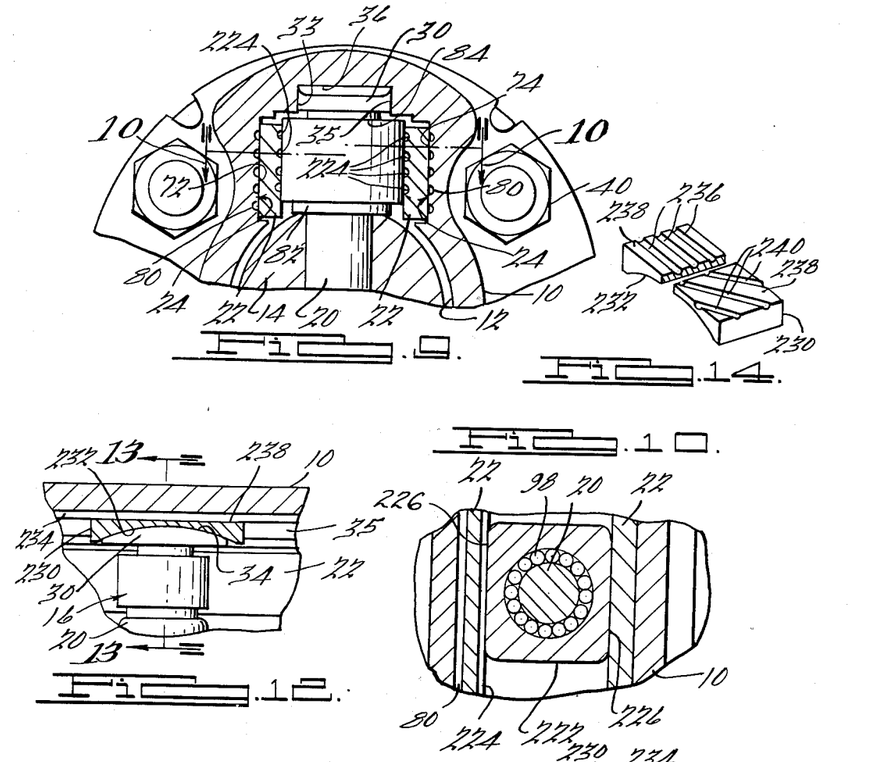
FIGURE 9 is a fragmentary cross-sectional view, similar to FIGURES 2 and 5, illustrating a modification of the invention.
FIGURE 10 is a fragmentary cross-sectional view taken on the plane of line 10—10 of FIGURE 9.
FIGURE 12 is a fragmentary cross-sectional view of a still further modification of the invention.
FIGURE 14 is a perspective view illustrating modifications of one of the elements disclosed in FIGURES 12 and 13.

In FIGURES 9 and 10, which illustrate a further modification of the invention, like reference numbers are used to designate elements which are like or similar to those of FIGURES 1, 2 and 3.

The embodiment of FIGURES 9 and 10, contemplates the provision of a rectangular or flat-sided guide block 222 which is pivotally connected to the trunnion 20 by needle bearings 98 in the same general manner as, for example, bearing roller 86 of FIGURE 2. Further, in addition to lubricating grooves 80 formed in the slot 24, axially directed lubricating grooves 224 are formed on one side of inserts 22 in order to further enhance the sliding characteristics of the guide blocks 222. By providing relatively large and lubricated contacting surfaces 226 in the form of a guide block, the fretting of the individual contacting elements can be still further reduced.

Figure 11:
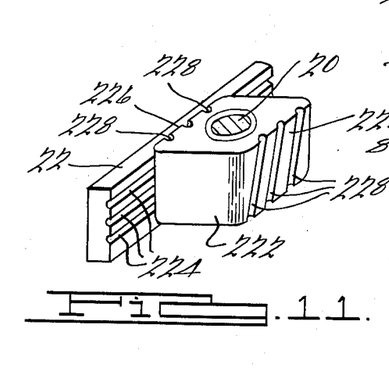
FIGURE 11 is a partial perspective view of a further modification of the invention as disclosed in FIGURES 9 and 10.

FIGURE 11 discloses a further modification of the invention wherein surfaces 226 of guide block 222 are provided with a plurality of vertically inclined lubricating grooves 228 which pass generally transversely to the lubricating grooves 224 of inserts 22 as the block slides within the confines of inserts 22. In all cases, inserts 22 are capable of experiencing movement relative to the slot 24 as described in detail with reference to FIGURES 1-6.

Figure 13:
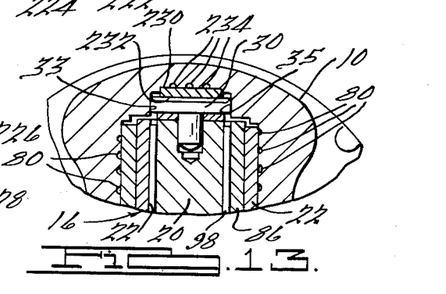
FIGURE 13 is a fragmentary cross-sectional view taken on the plane of line 13—13 of FIGURE 12.

FIGURES 12, 13 and 14 illustrate a still further modification of the invention wherein a shoe 230 is provided as between the cylindrical surfaces 34 of the respective centering buttons and end surface 36. The provision of a shoe 230 having a cylindrical surface 232 mating with surfaces 34 enables continual full surface contact of the button surfaces 34 during the full range of angular deflection of shaft 14. Whenever shaft 14 is deflected to an angle such as represented by centerline 100 of FIGURE 1, shoe 230 slides along end surface 36 while centering button 30, for example, rotates within surface 232.

The provision of axially directed elongated lubricating grooves 234 formed within the end surfaces as 36 is contemplated in order to reduce sliding friction between the coacting end surfaces and shoes. Further, as illustrated in FIGURE 14, axially directed lubricating grooves 236 may be provided in the sliding surface 238 of shoes 230. The provision of grooves 236 could be an alternative to the provision of grooves 234 formed in the end surfaces.

FIGURE 14 also discloses another form of lubricat-grooves 240 formed in sliding surface 238 at an angle with respect to the direction of sliding motion of shoe 230. Such grooves as 240 could be employed within a housing which is or is not provided with grooves 234 as illustrated by FIGURES 12 and 13.

The drawings and the foregoing specification constitute a description of the invention in such terms as to enable any person skilled in the art to practice the invention, the scope of which is indicated by the appended claims.

I claim:

1. A universal joint, comprising a housing, a shaft receiving opening formed within said housing and extending generally axially thereof, an axially directed slot formed in said housing generally transversely thereof, said slot forming spaced elongated bearing receiving openings each of which is comprised of opposed planar wall surfaces substantially parallel to each other, a shaft receivable in said housing and in said shaft receiving opening, a trunnion transversally secured in said shaft and received within said housing, a bearing assembly mounted on said trunnion near each end thereof and loosely received within said bearing receiving openings, wear plates inserted between each of said wall surfaces and said bearing assemblies, said wear plates being of such dimensions as to be in continuous abutting engagement with said bearing assemblies while permitting of motion generally within the plane of said wall surfaces, and passage means formed in said planar wall surfaces for conveying a lubricating fluid to the side of the respective wear plates which abuts against said planar wall surface.

2. A universal joint, comprising a housing, a shaft receiving opening formed within said housing and extending generally axially thereof, an axially directed slot formed in said housing generally transversely thereof, said slot forming spaced elongated bearing receiving openings each of which is comprised of opposed parallel planar wall surfaces, a shaft receivable in said housing and in said shaft receiving opening, a trunnion transversally secured in said shaft and received within said housing, a bearing assembly mounted on said trunnion near each end thereof and loosely received within said bearing receiving openings, wear plates inserted between each of said wall surfaces and said bearing assemblies, said wear plates being of such dimensions as to be in continuous abutting engagement with said bearing assemblies and said wall surfaces while permitting of translational motion generally within the plane of said wall surfaces, a plurality of first passages formed in said planar wall surfaces which abut against said wear plates, a plurality of second passages formed in the surface of said wear plates which abuts against said bearing assemblies, and a plurality of third passages formed in the surface of said bearing assembly which engages said wear plates, said first, second and third passages being provided for directing a lubricant against the respective abutting surfaces in order to permit relatively free movement of said abutting surfaces with respect to each other.

3. A universal joint, comprising a body having a central opening and guideways of generally rectangular cross-section extending longitudinally of the joint axis and which are located radially outwardly of the central opening, a shaft projecting into said central opening and having radial trunnions respectively projecting into the guideways, a cylindrical roller in each guideway and having a bore pivotally receiving the trunnion, elongated bearing elements inserted respectively between opposite sides of each guideway and the roller therein, each of said bearing elements having a flat surface engaging one of said rollers and a flat surface engaging a wall surface of one of said guideways, and passage means formed in said guideways for conveying a lubricating fluid to said bearing elements in order to enable said bearing elements to at times freely slide along the wall surfaces of said guideways in directions which are simultaneously generally radially and axially of said central opening.

4. A universal joint comprising a housing having a shaft receiving opening and substantially axially extending slots of generally rectangular cross-section, a shaft movingly disposed in said opening and having trunnion portions thereon extending outwardly into said slots, bearing members received within said slots and respectively pivotally connected to said trunnion portions, and elongated inserts having at least two flat sides abuttingly received between the respective bearing members and the wall surfaces of said slots in a manner causing abutting contact between one of said flat sides and said bearing member and also causing abutting contact between an other of said flat sides and a wall surface of said slot, said elongated inserts being held against movement in one transverse direction by virtue of the abutting contact of the respective oppositely disposed bearing members and wall surfaces, said elongated inserts having limited movement in another transverse direction determined by first spaced abutment portions insertable into said housing, said elongated inserts also having limited longitudinal movement determined by second spaced abutments provided on said housing.

5. In a universal joint having a housing and a shaft receivable therein, a trunnion and bearing assembly receivable in the end of said shaft within said housing and comprising a trunnion member, a bearing pivotally received about each end of said trunnion member, and a centering button received in each end of said trunnion member and extending outwardly therefrom so as to engage parallel planar end surfaces formed in said housing, said centering buttons comprising of a stem portion received within said trunnion member and a head portion formed at one end of said stem portion and engaging at its outer-most surface said planar end surface, said outer-most surface being cylindrical in cross-section in a plane passing through the axis of said shaft and being substantially flat in a plane passing through the axis of said trunnion perpendicular to said shaft, and said outer-most surface having a substantially constant projected width so as to present a uniform centering surface engaging said planar end surface regardless of the relative angle between said shaft and housing.

6. A universal joint comprising a body having parallel torque transmitting guideways of generally rectangular cross-section formed therein in opposed relationship to each other about a centrally disposed opening, opposed and parallel centering guide surfaces formed generally between and outwardly of said torque transmitting guideways, wear plates of generally rectangular cross-section slidably engaging the sides of said torque transmitting guideways, shoulder portions formed in said guide ways for limiting the movement of said wear plates generally radially of said centrally disposed opening, a shaft projecting into said opening, a trunnion transversely secured to said shaft near the end thereof and received in said opening, bearings mounted about the respective ends of said trunnion projecting into said torque transmitting guideways and being confined therein by said wear plates disposed on opposite sides of said bearings, and centering means connected to each end of said trunnion and projecting outwardly therefrom, said centering means including a centering surface comprised of a cylindrical segment continually in engagement with said parallel guide surfaces during relative angular movements of said body and shaft.

7. A universal joint, comprising a housing having a centrally disposed opening formed therethrough, a first elongated guideway formed in said housing extending generally axially of said opening, a second elongated guideway formed in said housing and extending generally axially of said opening, said first and second guideways being of generally U-shaped cross-section and having their opposed side surfaces flat and parallel to each other terminating in said centrally disposed opening, first and second axially extending spaced shoulder portions formed on each side surface of said first and second guideways, an end plate secured to said housing in a manner closing one end of said opening and said first and second guideways, a generally U-shaped abutment member received within each of said guideways in a manner having the leg portions thereof generally parallel to said side surfaces and directed inwardly of said housing, said abutment members being limited in movement outwardly of said housing by said end plate and limited in movement generally radially of said opening by said spaced shoulder portions, a shaft received within said opening through the other end of said housing for relative axial and angular movement therein, a trunnion member transversely secured to one end of said shaft and having its opposite ends projecting radially outwardly therefrom, a bearing member pivotally mounted about each end of said trunnion and respectively received within said guideways, a plurality of axially directed elongated lubricating grooves formed in each of said guideway side surfaces, a plurality of relatively hard elongated wear plates of generally rectangular cross-section respectively closely received between each guideway and said pivotal bearing member so as to confine said bearing members therebetween, parallel and opposed centering guide surfaces formed in said housing generally between said side surfaces and outwardly of said guideways, centering buttons secured to each end of said trunnion respectively engaging said centering guide surfaces, said centering buttons being comprised of a stem portion received by said trunnion and a centering head portion formed thereon, said head portion being in the form of a cylindrical segment so as to maintain a relatively constant contacting area with said centering guide surfaces during relative angular displacement of said shaft, said wear plates being capable of movement relative to said side surfaces only in planes determined by said side surfaces, said wear plates being limited in the total amount of said relative movement in a direction generally radially of said centrally disposed opening by said spaced shoulder portions and in one axial direction by said abutment members and in the opposite axial direction by a second end member secured to said housing, and a flexible seal located generally about said shaft and having one end operatively secured to said housing and the other end operatively secured to and about said shaft.

8. A universal joint, comprising a housing, a shaft receiving opening formed within said housing and extending generally axially thereof, an axially directed slot formed in said housing generally transversely thereof, said slot forming spaced elongated bearing receiving openings each of which is comprised of opposed planar wall surfaces substantially parallel to each other, a shaft receivable in said housing and in said shaft receiving opening, a trunnion transversely secured in said shaft and received within said housing, a bearing assembly mounted on said trunnion near each end thereof and loosely received within said bearing receiving openings, wear plates inserted between each of said wall surfaces and said bearing assemblies, said wear plates being of such dimensions as to be in continuous abutting engagement with said bearing assemblies while permitting of motion generally within the plane of said wall surfaces, passage means formed in said planar wall surfaces for conveying a lubricating fluid to the side of the respective wear plates which abuts against said planar wall surface, a pair of parallel axially directed end surfaces formed in said housing generally between said planar wall surfaces, centering means provided at each end of said trunnion adapted to continually contact said end surfaces, said centering means comprising a member having an outer surface of segmented cylindrical form engaging a concave cylindrical surface formed in a sliding shoe interposed between said end surface and member, and passage means formed in said end surface for conveying a lubricating fluid to said sliding shoe.

9. A universal joint, comprising a housing, a shaft receiving opening formed within said housing and extending generally axially thereof, an axially directed slot formed in said housing generally transversely thereof, said slot forming spaced elongated bearing receiving openings each of which is comprised of opposed planar wall surfaces substantially parallel to each other, a shaft receivable in said housing and in said shaft receiving opening, a trunnion transversely secured in said shaft and received within said housing, a bearing assembly mounted on said trunnion near each end thereof and received within said bearing receiving openings, a pair of parallel axially directed end surfaces formed in said housing generally between said planar wall surfaces, and centering means provided at each end of said trunnion adapted to continually contact said end surfaces, said centering means comprising a member having an outer surface of segmented cylindrical form engaging a concave cylindrical surface formed in a sliding shoe interposed between said end surface and member.

10. A universal joint, comprising a housing, a shaft receiving opening formed within said housing and extending generally axially thereof, an axially directed slot formed in said housing generally transversely thereof, said slot forming spaced elongated bearing receiving openings each of which is comprised of opposed planar wall surfaces substantially parallel to each other, a shaft receivable in said housing and in said shaft receiving opening, a trunnion transversely secured in said shaft and received within said housing, a bearing assembly mounted on said trunnion near each end thereof and received within said bearing receiving openings, a pair of parallel axially directed end surfaces formed in said housing generally between said planar wall surfaces, centering means provided at each end of said trunnion adapted to continually contact said end surfaces, said centering means comprising a member having an outer surface of segmented cylindrical form engaging a concave cylindrical surface formed in a sliding shoe interposed between said end surface and member and passage means formed in said end surface for conveying a lubricating fluid to said sliding shoe.

11. A universal joint, comprising a housing, a shaft receiving opening formed within said housing and extending generally axially thereof, an axially directed slot formed in said housing generally transversely thereof, said slot forming spaced elongated bearing receiving openings each of which is comprised of opposed planar wall surfaces substantially parallel to each other, a shaft receivable in said housing and in said shaft receiving opening, a trunnion transversely secured in said shaft and received within said housing, a bearing assembly mounted on said trunnion near each end thereof and received within said bearing receiving openings, a pair of parallel axially directed end surfaces formed in said housing generally between said planar wall surfaces, centering means provided at each end of said trunnion adapted to continually contact said end surfaces, said centering means comprising a member having an outer surface of segmented cylindrical form engaging a concave cylindrical surface formed in a sliding shoe interposed between said end surface and member and passage means formed in said end surface and said sliding shoe for conveying a lubricating fluid to said sliding shoe.

12. A universal joint, comprising a housing, a shaft receiving opening formed within said housing and extending generally axially thereof, an axially directed slot formed in said housing generally transversely thereof, said slot forming spaced elongated bearing receiving openings each of which is comprised of opposed planar wall surfaces substantially parallel to each other, a shaft receivable in said housing and in said shaft receiving opening, a trunnion transversely secured in said shaft and received within said housing, a bearing assembly mounted on said trunnion near each end thereof and received within said bearing receiving openings, a pair of parallel axially directed end surfaces formed in said housing generally between said planar wall surfaces, centering means provided at each end of said trunnion adapted to continually contact said end surfaces, said centering means comprising a member having an outer surface of segmented cylindrical form engaging a concave cylindrical surface formed in a sliding shoe interposed between said end surface and member, and passage means formed in said sliding shoe for conveying a lubricating fluid to said end surface.

13. A universal joint, comprising a housing, a shaft receiving opening formed within said housing and extending generally axially thereof, an axially directed slot formed in said housing generally transversely thereof, said slot forming spaced elongated bearing receiving openings each of which is comprised of opposed planar wall surfaces substantially parallel to each other, a shaft receivable in said housing and in said shaft receiving opening, a trunnion transversely secured in said shaft and received within said housing, a bearing assembly mounted on said trunnion near each end thereof and received within said bearing receiving openings, a pair of parallel axially directed end surfaces formed in said housing generally between said planar wall surfaces, centering means provided at each end of said trunnion adapted to continually contact said end surfaces, said centering means comprising a member having an outer surface of segmented cylindrical form engaging a concave cylindrical surface formed in a sliding shoe interposed between said end surface and member, and spaced side surfaces extending from said end surfaces for slidably confining said member.

14. A universal joint comprising a body having parallel torque transmitting guideways of generally rectangular cross-section formed therein in opposed relationship to each other about a centrally disposed opening, opposed and parallel centering guide surfaces formed generally between and outwardly of said torque transmitting guideways, wear plates of generally rectangular cross-section slidably engaging the sides of said torque transmitting guideways, abutment means carried by said body for limiting the movement of said wear plates generally radially of said centrally disposed opening, a shaft projecting into said opening, a trunnion transversely secured to said shaft near the end thereof and received in said opening, bearings mounted about the respective ends of said trunnion projecting into said torque transmitting guideways and being confined therein by said wear plates disposed on opposite sides of said bearings, and centering means connected to each end of said trunnion and projecting outwardly therefrom, said centering means including a centering surface comprised of a cylindrical segment continually in operative engagement with said parallel guide surfaces during relative angular movements of said body and shaft.

15. A universal joint, comprising a housing, a shaft receiving opening formed within said housing and extending generally axially thereof, said slot forming spaced elongated bearing receiving openings each of which is comprised of opposed planar wall surfaces substantially parallel to each other, a shaft receivable in said housing and in said shaft receiving opening, a trunnion transversely secured to said shaft and received within said housing, a bearing assembly mounted on said trunnion near each end thereof and received within said bearing receiving openings, a pair of parallel axially directed end surfaces formed in said housing generally between said planar wall surfaces, centering means provided at each end of said trunnion adapted to continually contact said end surfaces, said centering means comprising a member having an outer surface of segmented cylindrical form engaging said end surface, and spaced side surfaces extending from said end surfaces for slidably confining said member.

16. A universal joint, comprising a housing having a centrally disposed opening formed therethrough, a first elongated guideway formed in said housing extending generally axially of said opening, a second elongated guideway formed in said housing and extending generally axially of said opening, said first and second guideways being of generally U-shaped cross-section and having their opposed side surfaces flat and parallel to each terminating in said centrally disposed opening, first and second axially extending spaced shoulder portions formed on each side surface of said first and second guideways, an end plate secured to said housing in a manner closing one end of said opening and said first and second guideways, a generally U-shaped abutment member received within each of said guideways in a manner having the leg portions thereof generally parallel to said side surfaces and directed inwardly of said housing, said abutment members being limited in movement outwardly of said housing by said end plate and limited in movement generally radially of said opening by said spaced shoulder portions, a shaft received within said opening through the other end of said housing for relative axial and angular movement therein, a trunnion member transversely secured to one end of said shaft and having its opposite ends projecting radially outwardly therefrom, a bearing member pivotally mounted about each end of said trunnion and respectively received within said guideways, a plurality of axially directed elongated lubricating grooves formed in each of said guideway side surfaces, a plurality of relatively hard elongated wear plates of generally rectangular cross-section respectively closely received between each guideway and said pivotal bearing member so as to confine said bearing members therebetween, parallel and opposed centering guide surfaces formed in said housing generally between said side surfaces and outwardly of said guideways, and centering buttons secured to each end of said trunnion respectively engaging said centering guide surfaces, said centering buttons being comprised of a stem portion received by said trunnion and a centering head portion formed thereon, said head portion being in the form of a cylindrical segment so as to maintain a relatively constant contacting area with said centering guide surfaces during relative angular displacement of said shaft, said wear plates being capable of movement relative to said side surfaces only in planes determined by said side surfaces, said wear plates being limited in the total amount of said relative movement in a direction generally radially of said centrally disposed opening by said spaced shoulder portions and in one axial direction by said abutment members and in the opposite axial direction by a second end member secured to said housing.

References Cited by the Examiner

UNITED STATES PATENTS

| | | | |
|---|---|---|---|
| 771,457 | 10/04 | Bullard | 64—7 |
| 1,346,253 | 7/20 | Rayfield | 64—8 |
| 1,903,982 | 4/33 | Craik | 64—8 |
| 2,329,903 | 9/43 | Horne | 64—21 |
| 2,442,640 | 6/48 | Dunn. | |
| 2,555,921 | 6/51 | Davis | 64—8 |
| 2,722,115 | 11/55 | Dunn | 64—8 |
| 2,780,079 | 2/57 | Wahlberg | 64—7 |
| 2,926,510 | 3/60 | Lorean | 64—8 |
| 2,983,119 | 5/61 | Glover | 64—21 |
| 3,120,744 | 2/64 | Dunn | 64—8 |

FOREIGN PATENTS 18,938 1913 Great Britain.

ROBERT C. RIORDON, *Primary Examiner.*